United States Patent [19]

Godoroia

[11] Patent Number: 5,663,715
[45] Date of Patent: Sep. 2, 1997

[54] SYNCHRONIZED PAGING SYSTEM

[75] Inventor: Andrei Godoroia, Vancouver, Canada

[73] Assignee: Glenayre Electronics, Inc., Charlotte, N.C.

[21] Appl. No.: 687,788

[22] Filed: Jul. 19, 1996

Related U.S. Application Data

[62] Division of Ser. No. 311,736, Sep. 22, 1994, abandoned.

[51] Int. Cl.⁶ .................................................. H04Q 1/00
[52] U.S. Cl. ............................ 340/825.2; 340/825.44; 370/350; 455/31.3
[58] Field of Search .................... 340/825.2, 825.44; 455/38.1; 370/95.1; 379/57

[56] References Cited

U.S. PATENT DOCUMENTS

| | | | |
|---|---|---|---|
| 5,396,230 | 3/1995 | Motegi | 340/825.2 |
| 5,420,576 | 5/1995 | Matai | 340/825.2 |
| 5,485,463 | 1/1996 | Godoroja | 340/825.44 |
| 5,495,233 | 2/1996 | Kawashima | 340/825.2 |
| 5,555,183 | 9/1996 | Willard | 340/825.2 |

*Primary Examiner*—Brian Zimmerman
*Attorney, Agent, or Firm*—Christensen O'Conner; Johnson & Kindness PLLC

[57] ABSTRACT

A two-way paging system includes a paging terminal and one or more transmitters and receivers. The paging terminal, transmitter and receiver are synchronized to a common clock reference which is derived from the global positioning satellite system. The transmitter transmits paging signals in sequential frames having a predefined start time and duration. A paging unit is instructed to transmit its acknowledge signal during a predefined time slot. By synchronizing the paging terminal transmitters and receivers to a common clock the receivers are able to determine the frame number and time slot during which an acknowledge signal is transmitted based on the time of reception of the acknowledge signal. If the acknowledge signal is transmitted during the correct flame and time slot, the paging system can determine that the paging unit has received the paging message correctly.

5 Claims, 5 Drawing Sheets

1

SYNCHRONIZED PAGING SYSTEM

This is a divisional of the prior application Ser. No. 08/311,736, filed Sep. 22, 1994, now abandoned, the benefit of the filing date of which are hereby claimed under 35 U.S.C. §120.

FIELD OF THE INVENTION

The present invention relates to systems for synchronizing a plurality of receivers with a plurality of transmitters in a two-way paging system.

BACKGROUND OF THE INVENTION

Along with cellular telephones, paging units are becoming a common radio communication consumer device. A conventional paging unit has the ability to receive paging signals that are transmitted simultaneously on a forward channel by a plurality of transmitters throughout a geographic area. The paging signals cause the paging unit to beep or provide some other indication to the user that a paging message has been received. This paging message may be alphanumeric data or in some instances may be a digitized voice signal. However, recent advancements in paging technology have included the production of so-called "two-way paging" units that not only receive paging signals but also transmit their own acknowledge signals on a reverse channel back to a central paging terminal. Typically, the acknowledge signal is transmitted from the paging unit to a receiver which relays the acknowledge signal to the central paging terminal, to determine whether the paging unit has received the paging message correctly.

In order to prevent two paging units from transmitting their acknowledge signals simultaneously on the reverse channel, prior art two-way paging terminals provide an indication to a paging unit of the time period during which the paging unit is to transmit its acknowledge signal. Once an acknowledge signal is received by the paging terminal, it is associated with a particular paging unit in order to determine whether the paging unit has received its paging message correctly. One way of accomplishing this is by determining whether the paging unit transmitted its acknowledge signal at the correct time. For example, if a paging unit is instructed to transmit its acknowledge signal at some predetermined time and an acknowledge signal is received at the predetermined time, then the paging system can assume that the paging message was correctly received by the proper paging unit.

In order to determine whether a paging unit has transmitted an acknowledge signal at the proper time, the receiver(s) of the two-way paging system must be synchronized to the transmitters that transmit the paging signals. Prior art paging systems have achieved this synchronization by designing receivers that monitor the forward channel for the paging system's transmissions as well as the reverse channel for the acknowledge signals from the paging units. However, such receivers are inefficient because they must include two radio reception circuits, the first being tuned to transmissions from a paging transmitter and the second to acknowledge signals from the paging units. This not only increases the cost and complexity of a paging receiver, but increases the likelihood that a malfunction will occur.

As an alternative to synchronizing the paging receivers using the paging signals provided by the paging transmitters, it is possible to encode the time of transmission into the acknowledge signal transmitted from the paging unit to the receiver. However, such a system is inefficient because this adds unnecessary overhead to the reverse channel.

Therefore there is a need for a paging system that can synchronize multiple transmitters and receivers without requiring that the receivers monitor the paging system's message transmissions and without transmitting unnecessary information on the reverse channel.

SUMMARY OF THE INVENTION

A paging system according to the present invention includes a paging terminal, a plurality of transmitters and a plurality of receivers that are synchronized to a common independent clock source, to accurately determine whether a paging unit has received a paging message correctly. In particular, the terminal, transmitters, and receivers preferably are synchronized to timing signals from a global positioning satellite system. The transmitters transmit paging messages in frames having a scheduled protocol. The paging unit for which the paging message is intended is instructed to transmit an acknowledge signal during a specified time slot on a reverse channel. A paging unit synchronizes itself to a paging transmitter based on signals transmitted from the paging transmitter on the forward channel. Once the paging unit is synchronized to the paging transmitter, the paging unit can transmit its acknowledge signal during the preassigned time slot. The receivers are synchronized with the transmitter by reference to the independent clock source, so that the frame and time slot number during which an acknowledge signal is transmitted can be determined based on the time of receipt of the acknowledge signals on the reverse channel. The frame and slot number can therefore be used to determine whether the paging unit has received its paging message correctly.

A second aspect of the present invention allows a paging receiver multiple opportunities to properly decode paging signals transmitted from a paging unit. The paging unit transmits acknowledge signals according to a predefined format or protocol wherein one or more known codes are transmitted at a predefined time(s) within the time slot. A symbol timing circuit analyzes the received acknowledge signal for a synchronize code. If the receiver cannot detect the synchronize code, the receiver can be instructed to look for a new code based on the absolute time at which the new code is expected to arrive.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
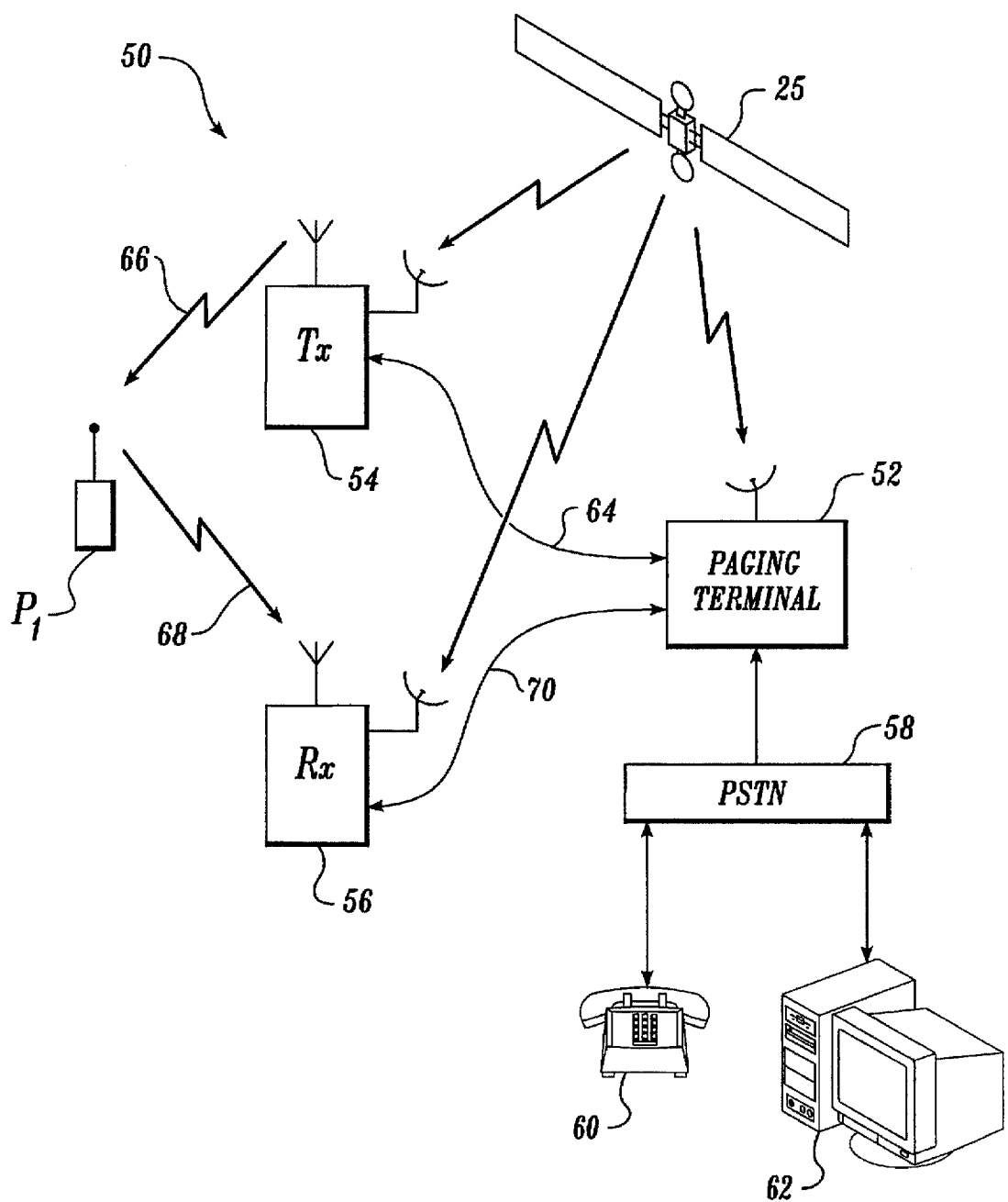
FIG. 1 is a schematic representation of a two-way paging system according to the present invention.

A two-way paging system 50 according to the present invention includes a paging terminal 52, one or more paging transmitters or base stations 54 and one or more receivers 56. The paging terminal 52 is coupled to a publicly switched telephone network (PSTN) 58. The PSTN 58 serves as the interface between the paging terminal and a caller on a telephone 60 or computer system 62. Once a paging message has been received and stored by the paging terminal, the paging terminal assembles the paging message into a data packet. The data packet includes the address of the paging unit for which the paging message is intended, error correction codes, an indication of the time at which the paging message is to be transmitted, as well as other information. The data packet is transmitted via a dedicated communication link 64 to one or more transmitters 54. The communication link 64 may be a leased telephone line, a microwave link, a satellite link, or other suitable communication paths. At the appropriate time, the paging message is transmitted on a forward radio channel 66 to a receiving paging unit $P_1$. Upon receipt Of the paging message, the paging unit $P_1$ transmits an acknowledge signal on a reverse radio channel 68 to the one or more receivers 56. The one or more receivers 56 then forward the acknowledge signal back to the paging terminal 52 on a dedicated communication link 70.

Figure 2:
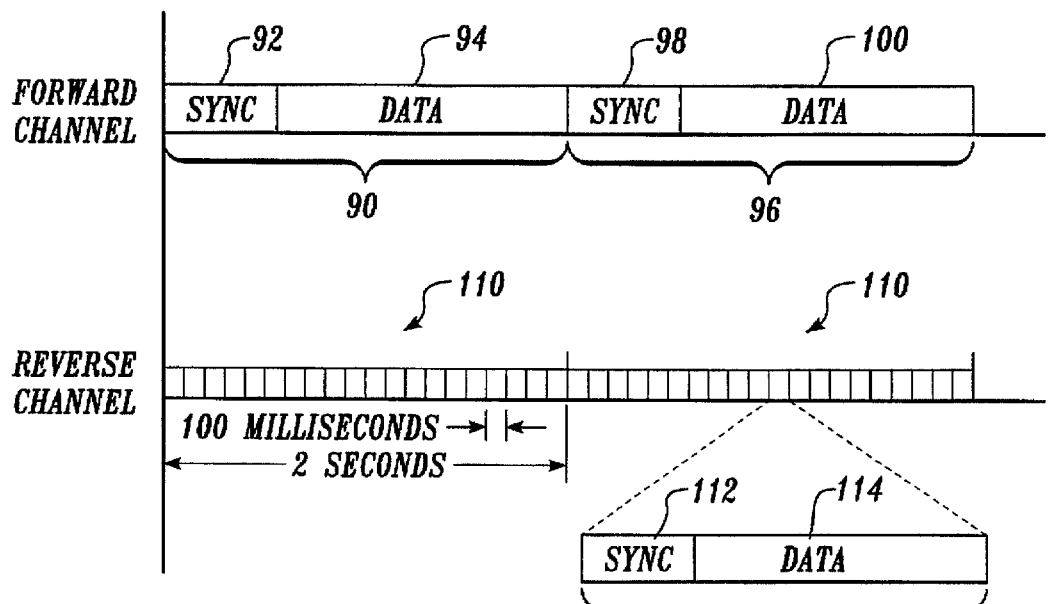
FIG. 2 is a timing diagram of a scheduled paging protocol transmitted by the paging system of the present invention.

FIG. 2 shows the format of the signals transmitted on the forward and reverse channels. Paging signals transmitted on the forward channel are divided into sequentially occurring frames 90, 96, and so on. Each frame is divided into subsections. A synchronize code 92 uses the beginning or leading portion of each frame, followed by the data 94 of the paging signal. The synchronize code 92 is used to synchronize the paging units with the paging signals transmitted on the forward channel. Having the paging units synchronized allows the paging units to implement battery saving algorithms. For example, if a paging unit does not detect its address within so many milliseconds of the beginning of the data portion 94 of the frame, it can turn itself off until the next frame begins. Furthermore, the paging units need to be synchronized with the transmitters so that the paging units will transmit their acknowledge signals at the correct times.

Each paging unit transmits its acknowledge signal packet during an assigned time slot 110 on the reverse channel. An acknowledge packet transmitted during the time slot 110 includes a leading synchronize code 112 and data 114 transmitted in a trailing portion of the time slot. In order to associate received acknowledge signals with a particular paging unit, it is necessary to determine the frame and time slot at which an acknowledge was transmitted. In order to determine the frame and time slot of the acknowledge signal, the receiver is synchronized with the paging system's transmitters which, in turn, supply the synchronization for the paging units. As indicated above, in prior art systems this is typically accomplished by designing a receiver that monitors the paging signal transmissions. Typical receivers monitor the forward channel for the synchronize codes which are used to reset an internal timer. However, for the masons mentioned above, such receivers are unduly complex and expensive.

In the present invention, the paging terminal 52, transmitters 54 and receivers 56 are all synchronized to a common independent clock signal. In the presently preferred embodiment of the invention, the clock signal is provided by a global positioning satellite (GPS) system. Each frame transmitted by the paging system has a predefined duration and is transmitted at a predefined time. For example, the paging protocol may define that each frame on the forward channel is exactly two seconds long, with 20 slots on the reverse channel during a two-second frame. Therefore, each slot on the reverse channel is 100 milliseconds in duration. With the paging terminal, transmitters and receivers synchronized to a common clock, the receivers can determine the frame and slot number during which an acknowledge signal was transmitted. As will be appreciated by those skilled in the art, the propagation delays associated with transmitting and receiving the paging signals are negligible in comparison with the duration of the frames on the forward channel and the time slots on the reverse channel.

Figure 3:
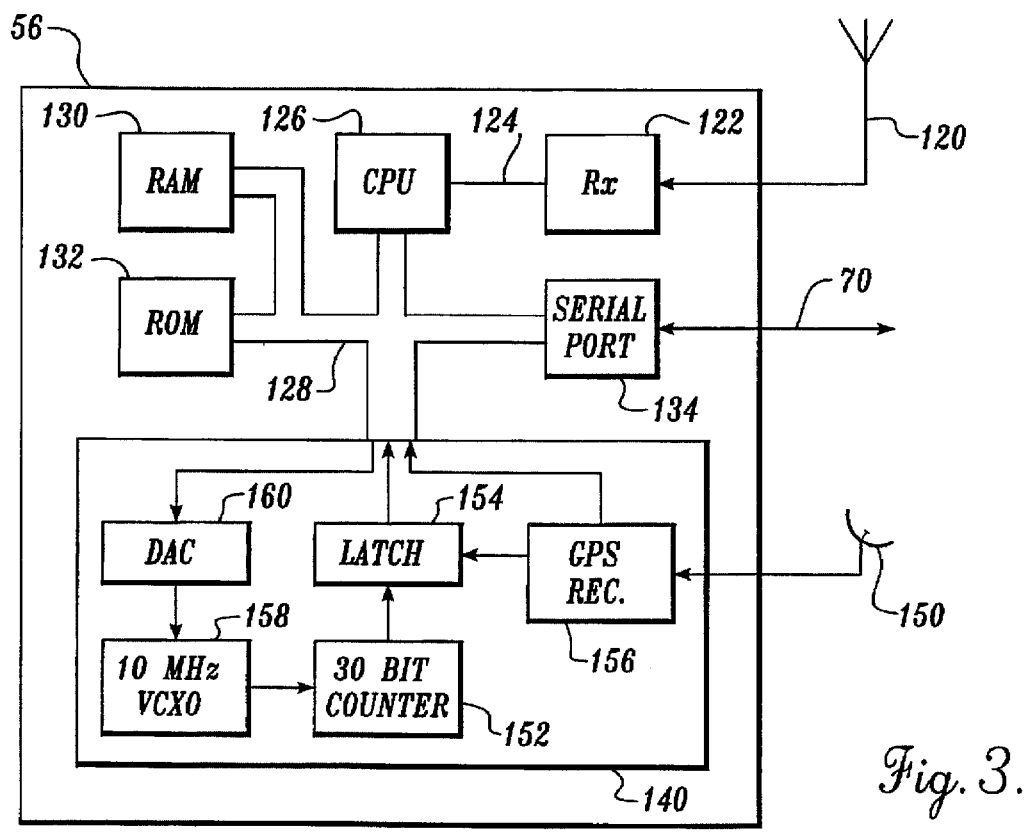
FIG. 3 is a block diagram of a paging receiver according to the present invention.

FIG. 3 is a block diagram of a receiver 56 for use in a paging system according to the present invention. The receiver 56 includes an antenna 120 which receives radio frequency signals from the remotely located paging units and feeds them to a receiver circuit 122. The receiver is coupled to a central processing unit 126 by a lead or bus 124. Also coupled to the central processing unit by a set of common bus-address leads is a random access memory (RAM) 130, a read only memory (ROM) 132, a serial port 134, and a timing circuit 140. The ROM 132 is used to store the computer program that operates the radio receiver 56. The RAM 130 is used to store a digitized version of the received radio signals. The serial port 134 is used to transmit data from the radio receiver 56 to the paging terminal via the communication link 70 described above. A GPS synchronized clock circuit is used to synchronize the radio receiver to the clock pulses transmitted by one or more global positioning satellites 25 shown in FIG. 1.

The GPS synchronized clock circuit 140 portion includes a satellite antenna 150, a counter 152, a latch 154, a GPS receiver 156, a 10 MHz voltage controlled oscillator 158 (VCXO), and a digital-to-analog converter (DAC) 160. These components operate in a cooperative manner to synchronize the radio receiver 56 with the timing signals transmitted by the global positioning satellite system.

The core components of the GPS synchronized clock circuit 140 are the CPU 126, the DAC 160, the VCXO 158, and the counter 152. The clock circuit 140 operates by having the VCXO 158 generate a clocking signal having a frequency of 10 MHz. A suitable VCXO 158 for producing this clocking signal is the Isotemp Research, Inc. Voltage-Controlled Oscillator, Model No. VCXO 134-10, which produces a variable-frequency output signal ranging between 9,999.988 and 10,000.012 Hz. The frequency of the output signal from the VCXO 158 is a function of the voltage applied to it by DAC 160.

Each time the VCXO generates one complete sinusoidal cycle of the clocking signal, the counter 152 advances one count. Optionally, a peak detector or other squaring circuit (not shown) may be interposed between the VCXO 158 and the counter 152 in order to convert the sinusoidal signal to a digital signal appropriate for driving counter 152.

The counter is a 30-bit binary counter set at modulo 600,000,000. Thus, the counter 152 advances in binary format until its count totals 599,999,999 and then resets to zero (0). Working in conjunction with a nominal 10 MHz signal from the VCXO 158, the counter will advance ten million counts each second. Because it is based on a modulo 600,000,000, the counter 152 will reset every sixty (60) seconds. Thus, each count of the counter 152 is nominally equivalent to an elapsed time of one-tenth of one microsecond (0.0000001 second). Moreover, the counter 152 may either be implemented in hardware, or alternatively, as software running on either the CPU 126 or on a separate processor. As a further alternative, the counter may be implemented as a combination of hardware and software.

Moreover, counter modules other than 600,000,000 and a VCXO having a frequency other than 10 MHz may be used. However, it is advantageous that the counter modulo divided by the frequency of the VCXO be a multiple of one minute or divide evenly into one minute. Thus, the precise implementation of the counter 152 is not critical and may be implemented in a variety of different manners.

As will be seen in greater detail below, the counter 152 maintains a measure of the number of tenths of microseconds (0.0000001 second) passing since it was last reset. If the time reference should temporarily or permanently fail, the counter value will drift relative to the start of a minute unless the VCXO 158 is operating at exactly 10 MHz. For this reason, the VCXO 158 is regulated by a VCXO control signal generated by the CPU 126. In one preferred embodiment of the system, the CPU 126 generates a 16-bit VCXO control signal for establishing the frequency of the clocking signal generated by the VCXO 158. The VCXO control signal is transferred over the parallel data bus 128 to the DAC 160. The DAC 160 converts the digital VCXO control signal into an analog VCXO control signal that is applied to the VCXO 158.

The clock circuit 140 is locked onto an external time reference, which in the preferred embodiment is the GPS time reference. It can be appreciated that the external time reference may come from any source, including a centrally located atomic clock. In the preferred embodiment, the GPS receiver 156 and satellite antenna 150 receive timing signals from one or more of the GPS satellites 25 shown in FIG. 1. These satellites generate highly accurate time and position signals. The satellites 25 are arranged so that at any point on the earth, a ground station, such as the GPS receiver 156, can receive the signals from at least four satellites.

A suitable GPS receiver 156 is the "NavCore V" receiver available from the Rockwell Corporation of Dallas, Tex. GPS receivers of this type generally have two outputs: a pulse output (which in FIG. 3 is connected to latch 154) and a serial data output (which can be read by the CPU 126). Approximately once per second, the GPS receiver determines its precise location and the absolute time at that location. The GPS receiver then generates a narrow pulse (typically one microsecond and referred to herein as a GPS time pulse) on its pulse output and outputs its location and the absolute time, valid for when the GPS time pulse occurred. The reference time from the GPS satellites is referred to herein as GPS absolute time. Further, since the clock circuit 140 is locked to the GPS absolute time, the time reference for the radio receiver 56 is equivalent to the GPS absolute time. It should be noted that correction for the propagation time between the GPS satellites and the GPS receiver 156 is automatically provided by the GPS receiver 156. Thus, at the time the GPS receiver 156 outputs a GPS absolute time, that time is the correct GPS absolute time at the location of the GPS receiver.

Moreover, the clock circuit 140 in FIG. 2 will also operate with other GPS receivers in which the GPS time pulse is generated exactly once per second and which only occasionally send the GPS absolute time on the serial data output. The CPU 126 can easily count the number of GPS time pulses since GPS absolute time was last received to determine the GPS absolute time of each GPS time pulse.

Figure 4:
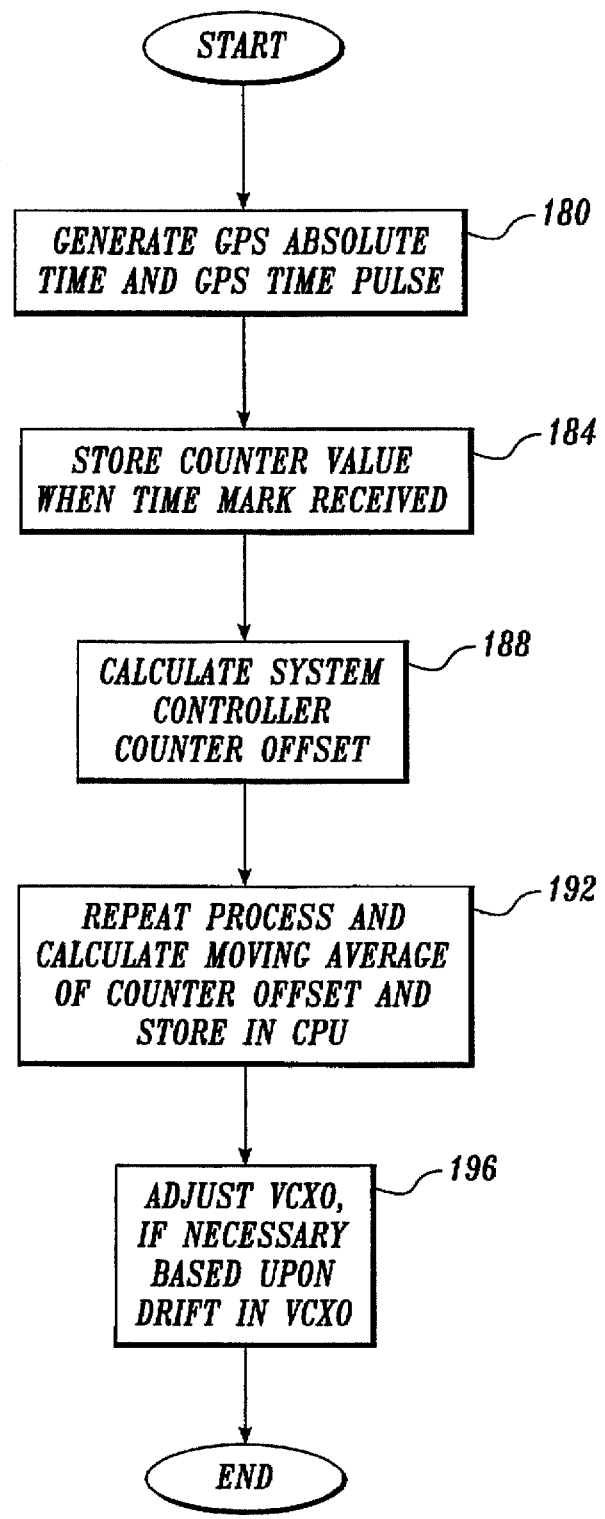
FIG. 4 is a flowchart showing the steps required to synchronize a clock circuit with timing pulses produced by a global positioning satellite system.

The CPU 126, which may be a Motorola 68302 32-bit microprocessor, along with associated RAM and ROM memory circuits 130, 132, is used to compare the time as maintained by the counter 152 with the GPS absolute time obtained from the GPS receiver. The method used by the present invention can best be understood by viewing both FIGS. 3 and 4.

In particular, synchronization of the clock circuit 140 to the GPS absolute time starts with the generation of the GPS time pulse and GPS absolute time information by the GPS receiver 156 as depicted in step 180. The GPS receiver 156 generates a GPS time pulse, which is input to latch 154. In turn, at step 184, latch 154 stores the value of counter 152 at the precise time the GPS time pulse is generated by the GPS receiver to allow reading by CPU 126 at any time before the next GPS time pulse. Additionally, the GPS absolute time as sent by the GPS receiver 156 is placed into a storage register in CPU 126.

When the radio receiver is initially powered up, the counter 152 is free running. Consequently, the counter 152 does not provide a recognizable indication of the GPS absolute time. For example, it is preferred that since the counter 152 "rolls over" every minute, the counter should read 000,000,000 when the paging system absolute time (as obtained from the GPS satellite) falls exactly on an even minute, e.g., 12:24:00.000. However, this condition rarely occurs and indeed, the probability of that occurrence is 600,000,000 to 1. Thus, at a step 188, a system controller counter offset must be determined in order for the counter 152 to be accurately used as a clock. First, the GPS absolute time and the counter value are placed into a format so that they can be readily compared to each other.

For example, the GPS absolute time is converted from a floating point representation into a fixed point number that is represented in binary format. Moreover, since the counter 152 only keeps track of the seconds portion of the GPS absolute time, for the purposes of determining counter offset, the hours and minutes portion of the GPS absolute time is discarded. Thus, the seconds portion of the GPS absolute time is converted into number of counts of tenths of microseconds from the beginning of the minute. For example, if the GPS absolute time were 12:34:04.123, then the decimal representation of the number of tenths of microseconds is 41,230,000.

The difference between the value of the counter 152 (also referred to herein as counter value) stored by latch 154 and the value of the representation of the tenths of microseconds of the GPS absolute time is calculated. This difference indicates the amount by which the counter is offset from the GPS absolute time or the system controller counter offset.

To illustrate, assume that when GPS receiver 156 outputs a GPS time pulse, the GPS absolute time is 12:34:56.789 and that when latch 154 is activated by the GPS time pulse, the value of counter 152 is 282,820,000. Looking only at the seconds portion of the GPS absolute time and converting over to counter increments, the GPS absolute time is equivalent to 567,890,000 counter increments. Thus, by subtracting the 282,820,000 from 567,890,000, the system controller counter offset value is 285,070,000 counts. The counter offset value is important in determining the system time. For example, if at some future time, the counter value is 100,000,000, then the system time (equivalent to GPS absolute time in the preferred embodiment) is 38.507 seconds (100,000,000+285,070,000=385,070,000 counts) after the beginning of a minute.

The first calculated counter offset when the radio receiver is initially powered up is stored in the CPU 126. However, as additional time pulses and GPS timing information are generated by the GPS receiver 156, the counter offset is "fine tuned." Specifically, at step 192, the process of steps 180–188 is repeated For each GPS time pulse. A moving average of the counter offset is then calculated in step 192, based on a predetermined number of offsets; For example, the last 100 calculated counter offsets. In the preferred embodiment, the moving average is calculated by means of a digital filter. Thus, the counter offset is continually being fine tuned and stored in the CPU 126. It can be appreciated that if the VCXO 158 is operating at exactly 10 MHz, then the system controller counter offset should be substantially the same over a period of time.

Continued drift of the counter offset over several iterations of steps 180–188, indicates that the frequency of the VCXO 158 is not exactly 10 MHz. In such a case, at step 196, CPU 126 generates a VCXO control signal that is applied to DAC 160 and then to VCXO 158. The VCXO control signal tunes the VCXO such that the VCXO more accurately produces a 10 MHz signal. In particular, CPU 126 determines the extent to which the frequency of the output signal of VCXO 158 should be adjusted up or down. In situations in which the counter offset tends to drift upward, a VCXO control signal decreasing the frequency of the VCXO 158 is calculated. In cases in which the counter offset tends to drift downward, a VCXO control signal increasing the frequency of the VCXO 158 is calculated. The increase or decrease of the frequency of the VCXO 158 varies in inverse proportion with the drift in the counter offset.

One method of calculating the VCXO control signal involves first mathematically calculating a VCXO setting that would theoretically perfectly correct the counter offset drift, and then from that calculation, generating a new VCXO control signal that corrects for that drift. For example, assume that the counter offset has drifted upward 60 counts in one minute, which translates into a drift of one count every second. This drift indicates that the frequency of the VCXO 158 is 10,000,001 Hz, i.e., that the VCXO is slightly fast. The CPU 126 would then apply a VCXO control signal that will reduce the frequency of the VCXO 158 by 1 Hz.

Alternatively, an adaptive method may be used to calculate the VCXO control signal. The adaptive method initially measures the drift in the counter offset over a short period as in the method above. However, as the drift is reduced, the drift in the system controller counter offset is measured over a longer interval (tens of minutes). For example, when a time pulse arrives, the counter offset is compared to the counter offset of a time pulse received many minutes before (on the order of 30 minutes prior). The differences in the counter offsets are then averaged using a running average. This method provides a final VCXO control signal that is extremely accurate.

For example, suppose that at one minute past the hour, the counter offset was 43,500. At 31 minutes past the hour, the counter offset was 44,000. In other words, the offset has gained 50 microseconds (500 counter units) in 1800 seconds (30 minutes). The oscillator is thus too low in frequency, with a ratio of 1799.999950 divided by 1800.000000 which, when multiplied by 10 MHz, gives the actual VCXO frequency of 9,999,999.722 Hz. The VCXO then must be corrected for this discrepancy. Thus, it should be understood that in the foregoing example, the adjustment is merely illustrative and other methods for correcting the drift or determining the VCXO control signal may be used.

The entire process described above and shown in FIG. 4 is repeated continually to ensure that the clock circuit 140 is synchronized to GPS absolute time and that the VCXO 158 is operating at 10 MHz.

As indicated above, the paging system including the paging terminal 52, the one or more transmitters 54 and one or more receivers 56 are all synchronized to the common time source, which in the presently preferred embodiment of the invention is the global positioning satellite system. Each of the transmitters and the paging terminal also includes a GPS referenced time clock of the type described above. For the transmitters, the time clock is used to determine the exact time at which the paging signals should be transmitted. The paging terminal uses the time clock to accurately schedule the time at which the paging signals should be transmitted by the transmitters.

As indicated above, with the receiver synchronized to the transmitter, the frame and slot number of a acknowledge signal received on the reverse channel can be determined by its time of reception.

In a scheduled paging protocol, it is agreed upon that the first frame of the cycle will be transmitted at some predefined starting time such as midnight. Because the propagation time of the radio frequency signals is negligible compared to the length of the frames 90, 96, shown in FIG. 2, the receiver can determine the frame and slot of transmission based on the reception time of a received signal. This is accomplished by calculating the time at which a signal is received and comparing that time to the predefined start time. As can be seen in FIG. 2, if a first frame is transmitted on a forward channel at time t=5:00:00.000000 then the second frame will begin at t=5:00:02.000000 assuming that each frame is 2.000 seconds long. If a receiver receives an acknowledge signal at t=5:00:02.600000, then the receiver can determine that the acknowledge signal is transmitted in the second frame 96 because the time of receipt falls between the beginning of the second frame (t=5:00:02.000000) and the beginning of a third frame (t=5:00:04.000000). Additionally, the slot number can be determined by calculating the length of time between the receipt of the acknowledge signal and the beginning of the last frame (5:00:02.600000−5:00:02.000000=0.600000) and dividing the difference by the length of each slot (0.600000÷0.1000000=6). In the paging protocol, each paging unit being paged is instructed to transmit its acknowledge signal during a particular time slot on the reverse channel. Therefore, once the frame and slot information has been determined by the receiver, the information is transmitted back to the paging terminal in order to confirm whether the paging unit has received its paging message correctly.

As will be appreciated, the particular scheduled protocol used for transmitting data to and from the paging unit depends upon the many factors including how many users of the paging system are located within a geographic area, the manufacturer of the paging unit, the availability of radio frequency spectrum, etc.

In addition to calculating the frame and slot number of a transmission occurring on the reverse channel, the present invention also allows the receivers to more accurately detect signals From the paging units in marginal transmission conditions. Because most paging units are battery-powered, and therefore have limited transmission power, a great deal of effort has been devoted to finding ways of improving the reception of acknowledge signals transmitted from a paging unit. Typical solutions for improving data reception include the transmission of synchronization codes, described above, as well as transmitting error correction bits in addition to the data transmitted. The error correction bits allow a receiver to correct for bit errors that may occur during transmission. While the use of such codes increases the probability that data will be received correctly, they do not guarantee that the received data will be error free. A benefit of having the receiver synchronized to a common time source is that the receiver can be given multiple chances to synchronize itself to a received bit stream.

Figure 5:
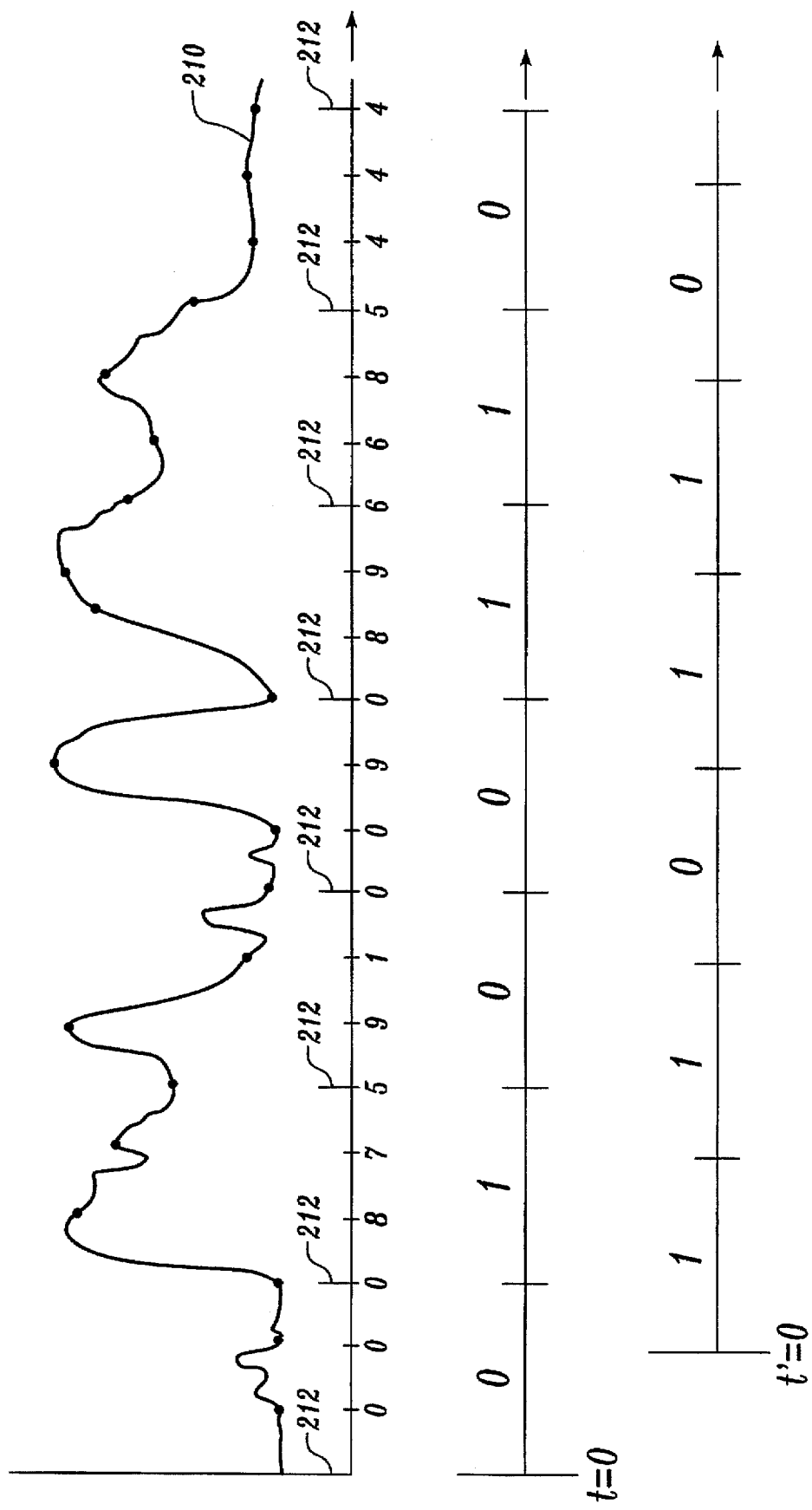
FIG. 5 is a timing diagram showing how errors in a received digital signal can occur by improperly determining a symbol edge in a transmitted data stream.

Before discussing how the synchronized paging system of the present invention can be used to increase the probability that a signal transmitted on the reverse channel will be received correctly, it is useful to discuss how a received digital radio signal is normally decoded. FIG. 5 shows a simplified example of how a received digital radio is typically decoded. Digital data transmitted from a paging unit to a receiver is transmitted as a modulated analog signal 210 that may contain any number of irregularities or distortion components. A decoder samples the analog signal at periodic intervals and stores the sampled signal in memory for conversion into a series of logic ones and zeros. Typical decoding schemes involve averaging the samples over a predetermined time and determining the logic level of the signal based on the averages. In the example shown in FIG. 5, the samples are weighted from zero to nine with three samples comprising a single digital bit. If the average of the three samples is five and above, then the signal is assigned a logic one. If the average is less than five, the signal is assigned a logic zero. In order to accurately decode the received signal, it is necessary to determine a symbol edge 212 that defines which samples are to be used in decoding the signal. Assume, for example, that a decoder correctly determines a symbol edge 212 begins at time t=0 for the signal 210 shown in FIG. 5. With the symbol edge correctly determined, the received analog signal 210 is decoded as 0100110. However, if for some reason the decoder mistakenly identifies or can not determine the symbol edges, then an error in decoding the signal may occur. For example, assume that a decoder mistakenly determines that a symbol edge begins at time t'=0. Then the received signal 210 is improperly decoded as 110110. The process of determining when a bit edge begins is typically performed by a symbol timing recovery circuit which continually estimates possible symbol edges. With each symbol edge possibility, the received signal is decoded and the result is compared to some predetermined bit pattern (i.e., the synchronization code). When the symbol edge is found that produces the synchronization code, the received signal can be properly decoded. As can be appreciated from this example, in order to decode a received digital signal correctly, the receiver must accurately determine the proper symbol edge.

Figure 6:
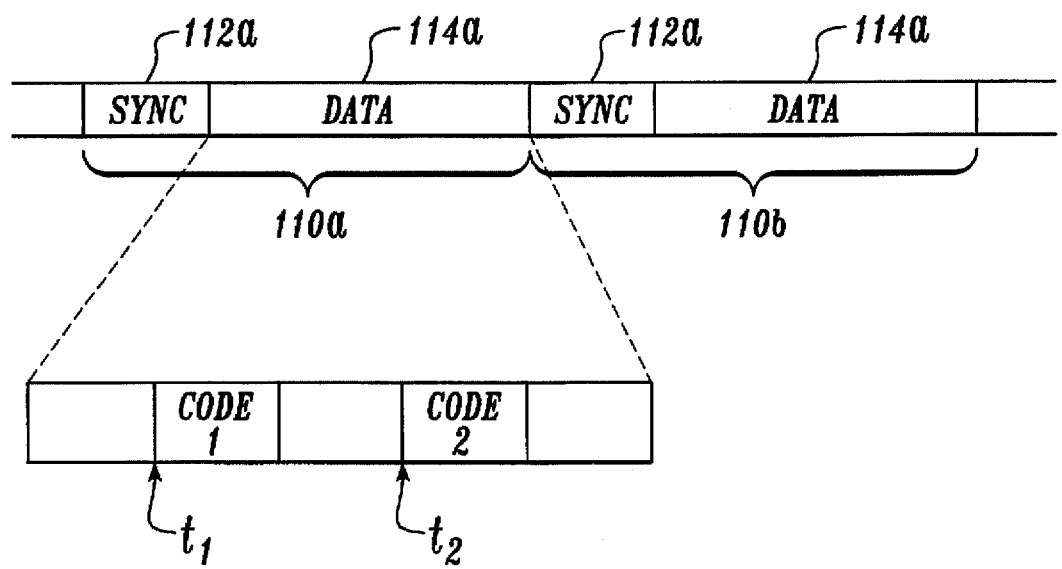
FIG. 6 is a timing diagram of a scheduled acknowledge signal transmitted according to the present invention.

The synchronized paging reception system of the present invention allows a receiver to better decode acknowledge signals received on the reverse channel when the signals are sent according to a predefined message format. FIG. 6 shows an enlarged view of the signals transmitted on the reverse channel. Each acknowledge signal from a paging unit is transmitted in one of a plurality of sequential slots 110A, 110B, etc. The beginning of each slot contains a synchronization code 112A, 112B that allows a receiver to properly determine a symbol edge and thus accurately decode the receive data. In prior art paging systems, if the decoder could not accurately lock on to the synchronization code 112A, then the entire section of data 114A could not be decoded and thus would require retransmission. However, the present invention allows a decoder multiple chances to lock onto the received data signal. If the data transmitted is constructed according to some predefined format, then the decoder can be programmed to look for codes within the data itself. If a symbol edge can be located within a code, then the decoder can use that symbol edge to properly decode the entire received paging signal. For example, the codes embedded in the data may include an acknowledge signal (Ack), nonacknowledge signal (Nack), or other codes in which the decoder is programmed to identify.

In order to properly identify the codes embedded within the data, the receiver must know the time at which these codes are to be transmitted within the data stream. This is achievable within the present invention because the receiver is time synchronized with the transmitters. Therefore, the decoder can be programmed to look for the synchronization code at the beginning of a time slot. If after a predefined length of time, the decoder does not detect the synchronization code, then the receiver can begin searching for other codes that it knows will be transmitted within the data portion of the time slot. For example, if the decoder can not detect the synchronization code, then it can be programmed to detect a code 1 that begins at a time $t_1$ within the data portion. If that code is not detected, the decoder can be reprogrammed to detect a code to begin at a time $t_2$. If a symbol edge within the synchronization code or any of the embedded codes can be accurately determined, then the decoder can better decode the received data signal.

Figure 7:
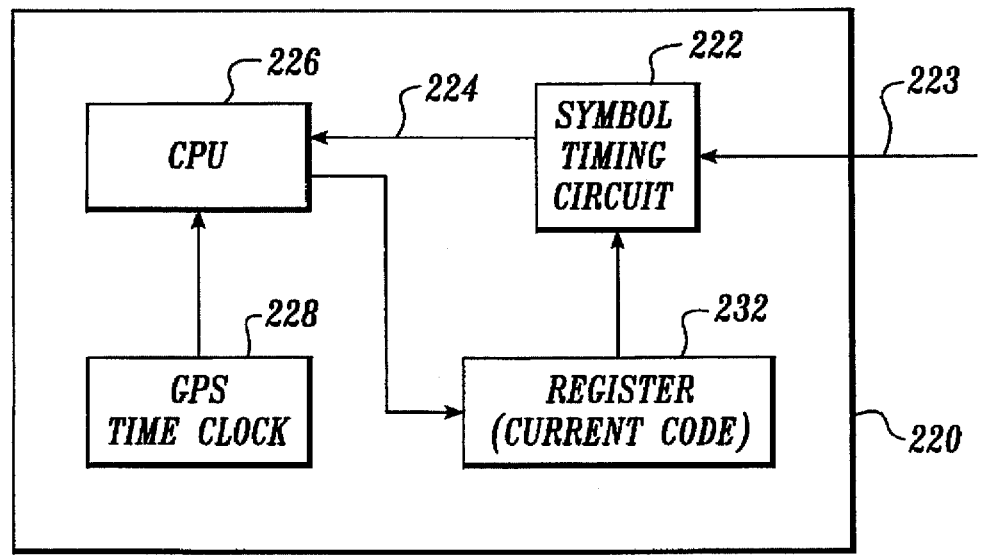
FIG. 7 is a block diagram of an adaptive decoder circuit used to decode acknowledge signals transmitted on the reverse channel.

FIG. 7 is a a block diagram of an adaptive decoder 220 that can more accurately decode signals received from paging units on the reverse channel. The decoder 220 includes a symbol timing circuit 222, a central processing unit 226, a GPS time clock 228 and a register 232. Signals received from the antenna of the radio receiver are fed via a lead 223 into the symbol timing circuit 222. Circuit 222 attempts to determine a symbol edge by decoding the received data stream and comparing it to a synchronization code that is stored within the register 232. If the symbol timing circuit detects the synchronization code, then a signal is supplied on a lead 224 that indicates to the CPU 226 that the symbol edge has been located and the signal can be properly decoded. If the synchronization code is not found, then the CPU can update the code stored in the register 232 so that the decoder will have multiple chances locate a symbol edge in the received data stream. As indicated above, the code stored in register 232 depends upon how much time has passed in the received data signal. For example, if the CPU expects an acknowledge signal to be transmitted at a predefined time within the time slot, then the code stored in the register 232 is updated based on the format of the acknowledge signal. The CPU works in conjunction with the time clock 228 to determine when the code should be updated. As will be appreciated, the synchronized time clock 228 is preferably implemented using the GSP time clock described above. In the preferred embodiment of the present invention, the decoder 220 is implemented using a digital signal processor chip.

As can be seen, the present invention allows a paging system to accurately determine the frame and slot number of a received acknowledge signal based upon the time of arrival of the signals from the paging units. Additionally, when the paging units transmit signals having a predefined protocol, the paging unit is able to have multiple opportunities to decode the signal because the receiver is time synchronized with the transmitters.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A circuit for decoding a paging signal received on a reverse channel from a remotely located paging unit which was transmitted in response to a paging message transmitted on a forward channel from a paging transmitter, comprising:

a register for storing a synchronize code;

a correlator circuit that samples the paging signal received on the reverse channel and analyzes the sample to determine if the received paging signal matches the synchronize code;

a timing circuit for providing an indication of the current time;

means for storing an indication of the time at which a beginning of the paging signal was received; and means for updating the register with a new synchronize code based on the time since the paging signal was received and the current time.

2. The circuit as in claim 1, wherein the timing circuit is synchronized to timing signals produced by a global positioning satellite system.

3. A paging reception system for decoding paging signals transmitted at a predefined time on a reverse channel from a remotely located paging unit, the paging signals including a synchronized code and at least one other code having a defined bit pattern transmitted at a known time within the paging signal, the reception system comprising:

an antenna for receiving;

a receiver circuit coupled to the antenna for receiving paging signals transmitted on the reverse channel, wherein the receiver creates a digitized version of the received paging signal;

a memory circuit that stores the digitized paging signal;

an adaptive decoder circuit that includes a register for storing a code that when detected indicates a symbol edge in the digitized paging signal;

a symbol timing circuit that compares the digitized paging signal with the code stored in the register, the symbol timing circuit providing an indication whether or not the digitized paging signal matches the code in the register;

a clock circuit that provides an indication of the current time; and a central processing unit that receives the signal produced by the symbol timing circuit and updates the code stored in the register if the symbol timing circuit cannot match the digitized paging signal with the code stored in the register, wherein said code is updated at the predefined time at which the code having the defined bit pattern is expected.

4. The paging reception of claim 3, wherein the clock is synchronized to timing signals produced by a global positioning satellite system.

5. A method of operating a paging receiver to receive paging signals of the type having a synchronized code that marks the beginning of the paging signal and at least one other code having a known bit pattern transmitted at a predefined time in the paging signal, comprising the steps of:

synchronizing the receiver to a common time source used by a remote paging unit to determine when a paging signal should be transmitted on the reverse channel;

storing a digitized version of the paging signals transmitted on the reverse channel; and programming a symbol timing circuit to analyze the digitized paging signals for the synchronized code that marks the beginning of the paging signal and, if the synchronized code cannot be found, reprogramming the symbol timing circuit to analyze the digitized paging circuit with the code having the defined bit pattern at the predefined time when the code is to be transmitted.

* * * * *

UNITED STATES PATENT AND TRADEMARK OFFICE
CERTIFICATE OF CORRECTION

PATENT NO.  : 5,663,715
DATED       : September 2, 1997
INVENTOR(S) : A. Godoroja It is certified that error appears in the above-indentified patent and that said Letters Patent is hereby corrected as shown below:

TITLE PAGE

| | | |
|---|---|---|
| Under item [19] | Inventor Name | "Godoroia" should read --Godoroja-- |
| Item [75] | Inventor | "Godoroia" should read --Godoroja-- |
| Col. 2 | Attorney, Agent or firm | "O'Conner;" should read --O'Connor-- |
| Abstract | 15 | "correct flame" should read --correct frame-- |

Signed and Sealed this

Seventeenth Day of February, 1998

Attest:

BRUCE LEHMAN

*Attesting Officer*  *Commissioner of Patents and Trademarks*